United States Patent
Yoeda et al.

(12) 
(10) Patent No.: US 6,276,317 B1
(45) Date of Patent: Aug. 21, 2001

(54) CONTROL APPARATUS AND METHOD FOR ELECTROMAGNETICALLY DRIVEN VALVES

(75) Inventors: Keiji Yoeda, Numazu; Isao Matsumoto, Susoso; Shouji Katsumata, Gotenba; Masaaki Tanaka, Susono, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/531,333

(22) Filed: Mar. 20, 2000

(30) Foreign Application Priority Data

Apr. 5, 1999 (JP) .................................. 11-098127

(51) Int. Cl.$^7$ ................................ F01L 9/04; F02D 13/02
(52) U.S. Cl. ............................................... 123/90.11
(58) Field of Search .......................... 123/90.11, 179.3, 123/198 D, 179.1

(56) References Cited

U.S. PATENT DOCUMENTS

| | | | |
|---|---|---|---|
| 5,596,956 | * | 1/1997 | Ogawa et al. ............ 123/90.11 |
| 5,671,705 | * | 9/1997 | Matsumoto et al. ........ 123/90.11 |
| 5,752,478 | * | 5/1998 | Sono et al. .............. 123/90.11 |
| 5,765,514 | * | 6/1998 | Sono et al. .............. 123/90.11 |
| 6,170,445 | * | 1/2001 | Hattori et al. ........... 123/90.11 |
| 6,202,608 | * | 3/2001 | Yamaki et al. ............ 123/90.11 |

FOREIGN PATENT DOCUMENTS

| | | |
|---|---|---|
| 10-18819 | 1/1998 | (JP) . |
| 10-18820 | 1/1998 | (JP) . |
| 10-252426 | 9/1998 | (JP) . |
| 2978962 | 9/1999 | (JP) . |

\* cited by examiner

*Primary Examiner*—Teresa Walberg
*Assistant Examiner*—Vinod D Patel
(74) *Attorney, Agent, or Firm*—Oliff & Berridge, PLC

(57) ABSTRACT

In control apparatus and method, an ECU detects the positions of intake valves of cylinders when an ignition switch is turned off. Then, the ECU continues supplying exciting current to first electromagnetic coils corresponding to completely closed intake valves to hold those intake valves in the completely closed state. The ECU brings to the intake valves that are not in the completely closed state at the time of determining the turning-off of the ignition switch, to the completely closed state. At the elapse of a predetermined time following the determination of turning-off of the ignition switch, the ECU stops supplying exciting current to the first electromagnetic coils of the intake valves to bring the intake valves to a held-open state.

36 Claims, 7 Drawing Sheets

CONTROL APPARATUS AND METHOD FOR ELECTROMAGNETICALLY DRIVEN VALVES

INCORPORATION BY REFERENCE

The disclosure of Japanese Patent Application No. HEI 11-98127 filed on Apr. 5, 1999 including the specification, drawings and abstract is incorporated herein by reference in its entirety.

BACKGROUND OF THE INVENTION

1. Field of the Invention

The invention relates to an electromagnetically driven valve control apparatus and, more particularly, to a control apparatus for electromagnetically driven valves that are used as intake valves and exhaust valves of an internal combustion engine.

2. Description of the Related Art

An electromagnetically driven valve is disclosed in, for example, Japanese Patent Application Laid-Open No. HEI 10-252426. The electromagnetically driven valve has a valve body that functions as an intake or exhaust valve of an internal combustion engine, and an armature fixed to the valve body. The valve body and the armature are displaceable in the directions of an axis of the valve body.

A first electromagnetic coil and an upper spring are disposed above the armature. A second electromagnetic coil and a lower spring are disposed below the armature. During a stop of the internal combustion engine, the armature is held at a neutral position, that is, an intermediate position between the first electromagnetic coil and the second electromagnetic coil, by the urging force from the upper and lower springs. The first electromagnetic coil and the second electromagnetic coil separately produce electromagnetic forces to attract the armature, upon receiving exciting current.

The armature and the valve body of the electromagnetically driven valve described above can be displaced in a valve opening direction by supplying exciting current to the first electromagnetic coil. The armature and the valve body can be displaced in the valve opening direction by supplying exciting current to the second electromagnetic coil. Therefore, according to the conventional electromagnetically driven valve, the exhaust or intake valve can be repeatedly opened and closed at arbitrary timing by supplying exciting current to the first electromagnetic coil and the second electromagnetic coil at suitable timing.

In an internal combustion engine equipped with electromagnetically driven valves as described above, the supply of exciting current to the first and second electromagnetic coils of each electromagnetically driven valve is stopped immediately upon turning off an ignition switch to stop the engine operation. As a result, an attraction force acting on the armature of each electromagnetically driven valve discontinues, so that each armature is held at a neutral position, that is, an intermediate position between the first electromagnetic coil and the second electromagnetic coil, due to urging force from the upper and lower springs. When the armatures of the electromagnetically driven valves are at the neutral position, the exhaust valves and the intake valves are held in a half-open state. Thus, according to the conventional electromagnetically driven valves, the exhaust valves and the intake valves are held in the half-open state after the ignition switch is turned off.

Normally, during an operation of an internal combustion engine and immediately after the engine operation stops, the pressure in the intake pipe becomes negative and lower than the pressure in the exhaust pipe. Therefore, with the above-described electromagnetically driven valves, since the exhaust valves and the intake valves are held at the half-open position upon the turning-off of the ignition switch, exhaust gas having a low oxygen concentration flows into the intake pipe via the exhaust and intake valves immediately after the internal combustion engine stops. If exhaust gas having a low oxygen concentration exists in the intake pipe, there is a possibility that when the internal combustion engine is to be started again, degraded engine starting characteristics may result from insufficient oxygen.

SUMMARY OF THE INVENTION

Accordingly, it is an object of the invention to provide a control apparatus that prevents exhaust gas from flowing into an intake passage of an internal combustion engine when the internal combustion engine stops.

In accordance with one aspect of the invention, a control apparatus includes electromagnetically driven actuators that respectively drive an intake valve and an exhaust valve of an internal combustion engine, at least the intake valve assuming an open state when its actuator is not electrified, and a controller coupled to the electromagnetically driven actuators that determines whether an ignition switch is turned off, and prevents an exhaust gas from flowing into an intake passage that communicates with the intake value by driving the electromagnetically driven actuators when the ignition switch is determined to have been turned off.

This control apparatus prevents exhaust gas having a low oxygen concentration from flowing into the intake passage by driving the electromagnetically driven actuators when the ignition switch is turned off to stop the internal combustion engine. Therefore, when the internal combustion engine is to be restarted, fresh air containing a sufficient amount of oxygen is supplied from the intake passage side into the combustion chamber, so that the degradation of the starting characteristic of the internal combustion engine is prevented.

In the control apparatus, the controller may hold the intake valve in a closed state during a predetermined length of time after the ignition switch is determined to have been turned off.

Therefore, during the predetermined time following the turning-off of the ignition switch, the intake valve is held in the closed state, thereby preventing exhaust gas from flowing into the intake pipe.

Furthermore, until a predetermined length of time elapses after the ignition switch is turned off, the controller may drive each of the valves at an opening-closing timing that is unchanged from an opening-closing timing that is used while the ignition switch is turned on during a normal operation of the internal combustion engine.

Therefore, until the predetermined length of time elapses after the ignition switch is turned off, each valve is driven (opened and closed) at the timing unchanged from the timing used during normal operation of the internal combustion engine. As a result, during the exhaust stroke, exhaust gas is discharged from the exhaust passage side and, during the intake stroke, fresh air is supplied from the intake passage side into the combustion chamber to fill the combustion chamber.

Still further, until a predetermined length of time elapses after the ignition switch is determined to have been turned off, the controller, during a process of displacement of a piston toward a top dead center, may set the intake valve to a closed state and may set an exhaust valve to the open state and, during a process of displacement of the piston toward a bottom dead center, may set the intake valve to the open state and may set the exhaust valve to the closed state.

Therefore, until the predetermined length of time elapses following the turning-off of the ignition switch, the intake valve is set to the closed state and the exhaust valve is set to the open state during the process of displacement of the piston toward the top dead center, so that exhaust gas is discharged. During the process of displacement of the piston toward the bottom dead center, the intake valve is set to the open state and the exhaust valve is set to the closed state, so that air is taken into the combustion chamber. Thus, after the ignition switch is turned off, the exhaustion and intake operation is performed in a two-stroke pumping manner as described above, so that exhaust gas is efficiently discharged out of the internal combustion engine and fresh air is drawn into the internal combustion engine from outside. The closed state of a valve means a completely closed state in which the corresponding intake or exhaust valve is seated on the valve seat. The open state of a valve means a state in which the corresponding intake or exhaust valve is apart from the valve seat.

The controller may reduce a negative pressure in the intake pipe by controlling at least one of an idle speed control valve of the internal combustion engine and a throttle valve of the internal combustion engine to an open side during a predetermined length of time after the ignition switch is determined to have been turned off.

Therefore, when the ignition switch is turned off to stop the internal combustion engine, exhaust gas is prevented from flowing into the intake passage by driving the electromagnetically driven actuators, and the difference between the pressure in the intake passage and the pressure in the exhaust passage is quickly reduced by controlling at least one of the idle speed control valve and the throttle valve to the open side. Therefore, the prevention of inflow of exhaust gas into the intake passage is ensured.

In accordance with another aspect of the invention, a control apparatus includes electromagnetically driven actuators that respectively drive an intake valve and an exhaust valve of an internal combustion engine, at least the intake valve assuming an open state when its actuator is not electrified, and a controller coupled to the electromagnetically driven actuators that determines whether an ignition switch is turned off, and reduces a negative pressure in an intake passage that communicates with the intake value when the ignition switch is determined to have been turned off.

Normally, the pressure in the intake passage is lower than the pressure in the exhaust passage during operation of the internal combustion engine and immediately after the engine operation stops. Therefore, if the intake valve is in the open state when the ignition switch is turned off, there is a possibility that exhaust gas having a low oxygen concentration will flow into the intake passage. However, in the above-described control apparatus, the controller reduces the negative pressure in the intake pipe, upon the turning off of the ignition switch. As a result, exhaust gas having a low oxygen concentration is substantially prevented from flowing into the intake passage. Therefore, when the internal combustion engine is restarted, fresh air containing a sufficient amount of oxygen is immediately supplied from the intake passage side into the combustion chamber, so that the degradation of the starting characteristic of the internal combustion engine is prevented.

In the control apparatus according to this aspect, the controller may control at least one of an idle speed control valve of the internal combustion engine and a throttle valve of the internal combustion engine to an open side when the ignition switch is turned off.

Therefore, when the ignition switch is turned off, at least one of the idle speed control valve and the throttle valve is controlled to the open side, so that the flow of air taken in from outside increases. As a result, the difference between the pressure in the intake passage and the pressure in the exhaust passage is quickly reduced, so that exhaust gas is prevented from flowing into the intake passage.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the invention will be described hereinafter with reference to the accompanying drawings.

Figure 1:
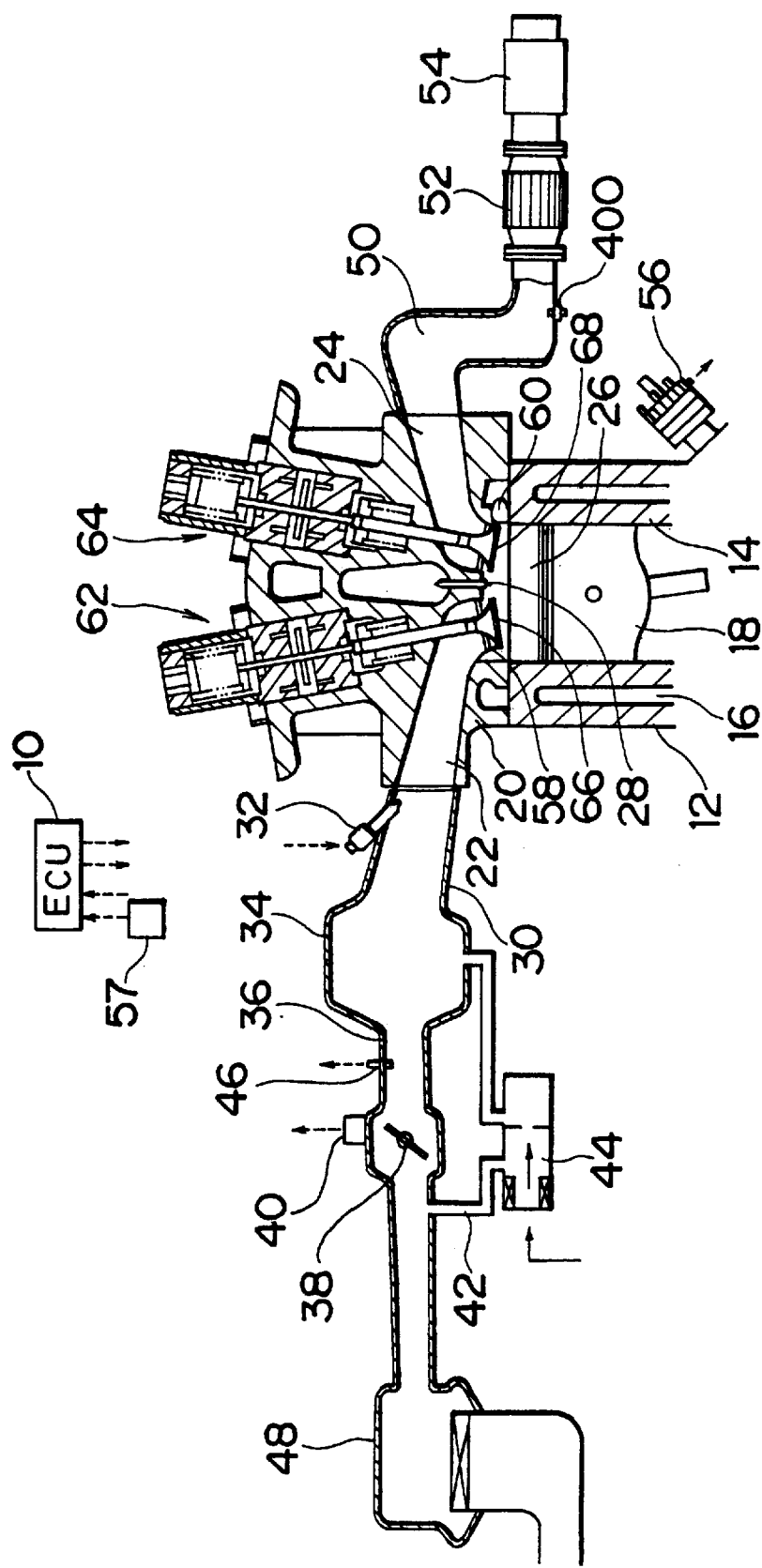
FIG. 1 is an illustration of a construction of a vehicle-installed internal combustion engine to which the control apparatus of the invention is applied.

FIG. 1 illustrates a construction of a vehicle-installed internal combustion engine to which first to third embodiments of the control apparatus of the invention is applied. A system according to each of the first to third embodiments is controlled by an ECU 10.

The internal combustion engine shown in FIG. 1 has a cylinder block 12 in which cylinders and a water jacket 16 are formed. The internal combustion engine is an in-cylinder injection type four-cylinder internal combustion engine having #1–#4 cylinders.

FIG. 1 shows only one cylinder 14 of the four cylinders (#1–#4).

A piston 18 is disposed in each cylinder 14. The pistons 18 are slidable up and down in the illustration of FIG. 1 within the cylinders 14. A cylinder head 20 is fixed to an upper portion of the cylinder block 12. Intake ports 22 and exhaust ports 24 are formed in the cylinder head 20 separately for the individual cylinders.

In each cylinder 14, a combustion chamber 26 is defined by a bottom surface of the cylinder head 20, an upper surface of the piston 18, and a side wall surface of the cylinder 14. The intake and exhaust ports 22, 24 are open to the corresponding combustion chambers 26. A distal end portion of an ignition plug 28 is exposed to each combustion chamber 26. Each ignition plug 28 ignites fuel in the corresponding combustion chamber 26 upon receiving an ignition signal from the ECU 10.

The intake ports 22 are connected in communication to an intake manifold 30 that is provided with fuel injection valves 32. The fuel injection valves 32 inject fuel in accordance with a control signal from the ECU 10. A surge tank 34 is connected to an upstream side of the intake manifold 30. The surge tank 34 is connected at its upstream side to an intake passage 36. The intake passage 36 is provided with a throttle valve 38. The throttle valve 38 is constructed to operate in association with an accelerator pedal (not shown). A throttle opening sensor 40 is disposed near the throttle valve 38.

The internal combustion engine is equipped with a bypass passage 42 that bypasses the throttle valve 38. The bypass passage 42 is provided with an idle speed control valve (hereinafter, simply referred to as "ISCV") 44. The ISCV 44 changes its opening in accordance with a drive signal from the ECU 10. The ECU 10 controls the extent of opening of the ISCV 44 so that an appropriate amount of air flows through the bypass passage 42, while the internal combustion engine is being idled, that is, while the throttle valve 38 is in a completely closed state. The ISCV 44 assumes a half-open state when not electrified, that is, when the ISCV 44 is not supplied with the drive signal from the ECU 10.

An intake pressure sensor 46 is provided in a portion of the intake passage 36 that extends downstream of the throttle valve 38. The intake pressure sensor 46 outputs to the ECU 10 a signal corresponding to the intake air pressure in the intake passage 36. Based on the output signal of the intake pressure sensor 46, the ECU 10 detects the intake air pressure in the intake pipe 36. The intake passage 36 is connected at its upstream end to an air cleaner 48. Thus, external air is filtered by the air cleaner 48 before entering the intake passage 36.

The exhaust ports 24 of the internal combustion engine shown in FIG. 1 are connected to an exhaust passage 50. The exhaust passage 50 is connected to a muffler 54 via a catalytic converter 52.

Exhaust gas produced during operation of the internal combustion engine is treated by the catalytic converter 52 for emissions control, and then sound-controlled by the muffler 54 before being emitted into the atmosphere.

The internal combustion engine is also equipped with a crank angle sensor 56 that is an electromagnetic pickup type sensor. The crank angle sensor 56 generates a pulse signal at every predetermined angle rotation of a crankshaft of the internal combustion engine, and generates a reference pulse every time the crank angle equals a predetermined reference angle. Based on the output signals of the crank angle sensor 56, the ECU 10 detects the crank angle and the revolution speed of the internal combustion engine.

The ECU 10 is connected to an ignition switch 57. Based on an output signal of the ignition switch 57, the ECU 10 detects on/off states of the ignition switch 57. When the ignition switch 57 is operated from the off-state to the on-state, the internal combustion engine starts.

Valve seats 58, 60 are formed in a combustion chamber-side opening end portion of each intake port 22, and a combustion chamber-side opening end portion of each exhaust port 24, respectively.

Electromagnetically driven valves 62, 64 are incorporated in the cylinder head 20. The electromagnetically driven valve 62 has a valve body 66 that functions as an intake valve of the internal combustion engine. That is, the valve body 66 of the electromagnetically driven valve 62 shuts the communication between the intake port 22 and the combustion chamber 26 by assuming a seated position on the valve seat 58. The valve body 66 connects the intake port 22 and the combustion chamber 26 in communication by moving off from the valve seat 58. Hereinafter, the valve body 66 is also termed intake valve 66.

The electromagnetically driven valve 64 has a valve body 68 that functions as an exhaust valve of the internal combustion engine. That is, the valve body 68 of the electromagnetically driven valve 64 shuts the communication between the exhaust port 24 and the combustion chamber 26 by assuming a seated position on the valve seat 60. The valve body 68 connects the exhaust port 24 and the combustion chamber 26 in communication by moving off from the valve seat 60. Hereinafter, the valve body 68 is also termed exhaust valve 68.

It should be appreciated that each cylinder may be provided with two intake valves 66 and two exhaust valves 68. That is, each cylinder may be provided with two electromagnetically driven valves 62 and two electromagnetically driven valves 64.

The electromagnetically driven valves 62, 64 have substantially the same construction. The construction and operation of an electromagnetically driven valve 62, as a representative of the valves 62, 64, will be described below with reference to FIG. 2.

Figure 2:
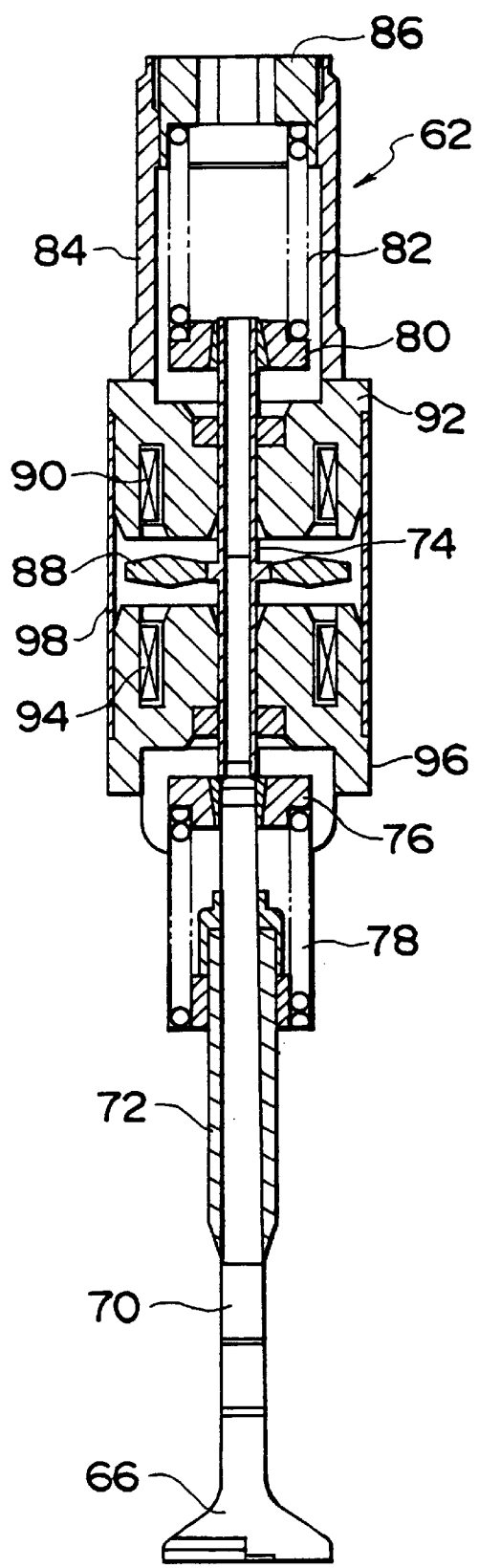
FIG. 2 is a sectional view of an overall construction of an electromagnetically driven valve.

FIG. 2 is a sectional view of an overall construction of an electromagnetically driven valve 62.

As shown in FIG. 2, the intake valve 66 is coupled to a valve shaft 70 that is supported by a valve guide 72 so as to be displaceable in the directions of an axis thereof. The valve guide 72 is fixed to an internal portion of the cylinder head 20 shown in FIG. 1. The electromagnetically driven valve 62 has an armature shaft 74 that contacts an upper end portion of the valve shaft 70. The armature shaft 74 is a rod-shaped member formed from a non-magnetic material. A lower retainer 76 is fixed to an upper end portion of the valve shaft 70. A lower spring 78 is disposed below the lower retainer 76. A lower end of the lower spring 78 is in contact with the cylinder head 20 as shown in FIG. 1. The lower spring 78 urges the valve shaft 70 and the armature shaft 74 upward (in FIG. 2) via the lower retainer 76.

An upper retainer 80 is fixed to an upper end portion of the armature shaft 74. An upper portion of the upper retainer 80 is in contact with a lower end portion of an upper spring 82. A cylindrical upper cap 84 is disposed around the upper spring 82 so as to surround an outer periphery of the upper spring 82. An upper end portion of the upper spring 82 is in contact with an adjuster bolt 86 that is screwed to the upper cap 84.

The upper spring 82 urges the valve shaft 70 and the armature shaft 74 downward (in FIG. 2) via the upper retainer 80.

An armature 88 is joined to an outer peripheral surface of the armature shaft 74. The armature 88 is an annular member formed from a soft magnetic material. A first electromagnetic coil 90 and a first core 92 are disposed above the armature 88. A second electromagnetic coil 94 and a second core 96 are disposed below the armature 88. The first core 92 and the second core 96 are both formed from a magnetic material. The armature shaft 74 is supported by a central portion of the first core 92 and a central portion of the second core 96 so that the armature shaft 74 is slidable up and down (in FIG. 2). Electrification of the first electromagnetic coil 90 and the second electromagnetic coil 94 is controlled by the ECU 10.

An outer cylinder 98 is disposed surrounding outer peripheral surfaces of the first core 92 and the second core 96. The outer cylinder 98 retains the first core 92 and the second core 96 so that a predetermined interval is secured between the cores. The upper cap 84 is fixed to an upper end surface of the first core 92. The adjuster bolt 86 is pre-adjusted so that the armature 88 is held at a neutral position that is substantially in the middle between the first core 92 and the second core 96 by the upper spring 82 and the second core 96 when neither the first electromagnetic coil 90 nor the second electromagnetic coil 94 is supplied with exciting current. When the armature 88 is held at the neutral position, the urging force from the upper spring 82 and the urging force from the lower spring 78 balance each other.

When the armature 88 of the electromagnetically driven valve 62 is in contact with the first core 92, the intake valve 66 is seated on the valve seat 58 shown in FIG. 1. This state is maintained by supplying a predetermined exciting current to the first electromagnetic coil 90. Hereinafter, the state in which the intake valve 66 is seated on the valve seat 58 is considered a completely closed (closed valve) state, and the positioned assumed by the intake valve 66 during that state is referred to as "completely closed position".

Upon discontinuation of the supply of exciting current to the first electromagnetic coil 90 when the intake valve 66 has been held at the completely closed position, the electromagnetic force on the armature 88 disappears, so that the armature 88 is displaced downward (in FIG. 2) by the urging force from the upper spring 82. When the amount of displacement of the armature 88 reaches a predetermined value, an appropriate exciting current is supplied to the second electromagnetic coil 94, so that an attraction force to pull the armature 88 toward the second core 96, that is, an attraction force to displace the intake valve 66 downward (in FIG. 2), is created.

With the attraction force acting on the armature 88, the armature 88 is displaced together with the intake valve 66 downward (in FIG. 2) against the urging force from the lower spring 78. Downward displacement of the intake valve 66 continues until the armature 88 contacts the second core 96. When the armature 88 is in contact with the second core 96, the intake valve 66 is at a farthest position from the valve seat 58 shown in FIG. 1. Hereinafter, the state in which the armature 88 is in contact with the second core 96 is considered a fully open state, and the position assumed by the intake valve 66 during that state is referred to as "fully open position". The fully open state is maintained by supplying a predetermined exciting current to the second electromagnetic coil 94.

Upon discontinuation of the supply of exciting current to the second electromagnetic coil 94 when the intake valve 66 has been held at the fully open position, the electromagnetic force on the armature 88 disappears, so that the armature 88 is displaced upward (in FIG. 2) by the urging force from the lower spring 78. When the amount of displacement of the armature 88 reaches a predetermined value, an appropriate exciting current is supplied to the first electromagnetic coil 90, so that an attraction force to pull the armature 88 toward the first electromagnetic coil 90, that is, an attraction force to displace the intake valve 66 upward (in FIG. 2), is created.

With the aforementioned attraction force acting on the armature 88, the armature 88 is displaced together with the intake valve 66 upward (in FIG. 2) against the urging force from the upper spring 82. Upward displacement of the intake valve 66 continues until the armature 88 contacts the first core 92, that is, until the completely closed state is established.

Thus, in the electromagnetically driven valve 62, the intake valve 66 can be displaced toward the completely closed position by supplying the predetermined exciting current to the first electromagnetic coil 90, and the intake valve 66 can be displaced toward the fully open position by supplying the predetermined exciting current to the second electromagnetic coil 94. Therefore, in the electromagnetically driven valve 62, the intake valve 66 can be repeatedly reciprocated between the completely closed position and the fully open position by supplying exciting current alternately to the first electromagnetic coil 90 and the second electromagnetic coil 94.

In this embodiment, each electromagnetically driven valve 64 having the exhaust valve 68 operates in the same manner as the electromagnetically driven valves 62 operate. Therefore, in the embodiment, the intake valves 66 and the exhaust valves 68 can be repeatedly opened and closed at arbitrary timing during operation of the internal combustion engine by the ECU 10 supplying instruction signals to driving circuits of the electromagnetically driven valves 62, 64 so that exciting current is supplied alternately to the first electromagnetic coil 90 and the second electromagnetic coil 94 of each of the electromagnetically driven valves 62, 64 at suitable timing.

When the vehicle ignition switch 57 is operated from the on-state to the off-state (that is, turned off) to stop the internal combustion engine, the supply of exciting current to the electromagnetically driven valves 62, 64 discontinues, so that the electromagnetic force on each armature 88 disappears. As a result, the armature 88 of each valve 62, 64 undergoes damping oscillation due to the urging forces from the upper spring 82 and the lower spring 78, and then stops at the neutral position between the completely closed position and the fully open position. At this moment, therefore, the intake valves 66 and the exhaust valves 68 all assume the half-open state.

Normally, the pressure in the intake passage 36 is lower than the pressure in the exhaust passage 50 during operation of the internal combustion engine and immediately after the engine operation stops. Therefore, if the exhaust valves 68 and the intake valves 66 all stop in the half-open state following the discontinuation of the supply of exciting current to the first electromagnetic coils 90 and the second electromagnetic coils 94 immediately after the turning-off operation of the ignition switch 57, exhaust gas having a low oxygen concentration flows into the intake manifold 30 and the intake passage 36 via the exhaust valves 68 and the intake valves 66 immediately after the internal combustion engine is stopped. If exhaust gas having a low oxygen concentration exists in the intake manifold 30 and the intake passage 36, there is a possibility that when the internal combustion engine is to be started again, degraded engine starting characteristic may result from insufficient oxygen.

In a first embodiment of the invention, therefore, when the ignition switch 57 is turned off to stop the internal combustion engine, the intake valves 66 are held at the completely closed position for a predetermined time so as to prevent exhaust gas from flowing into the intake passage 36. The first embodiment will be described below with reference to FIG. 3.

Figure 3:
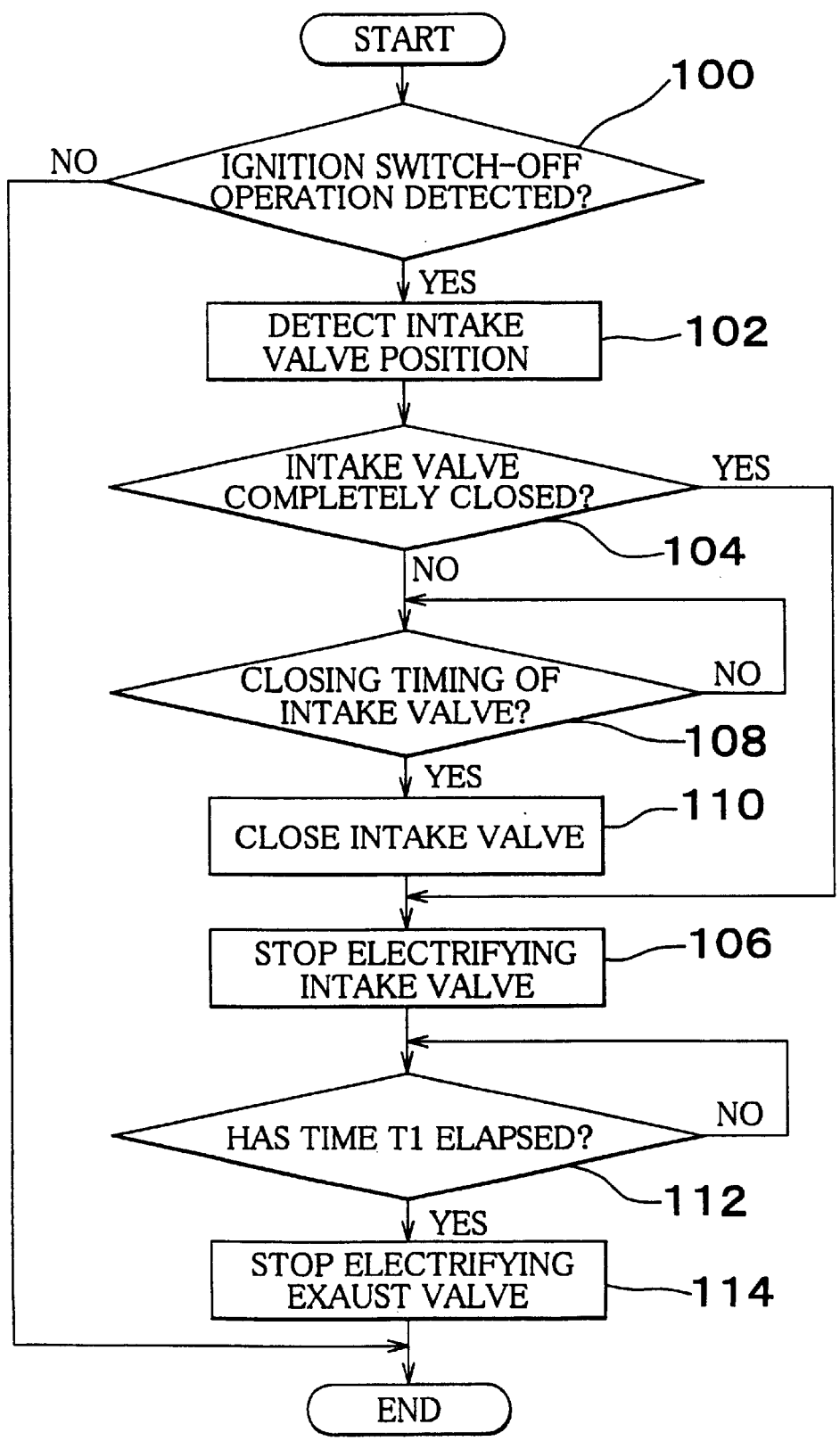
FIG. 3 is a flowchart illustrating a routine executed by an ECU in order to prevent exhaust gas from flowing into an intake manifold and an intake passage when an ignition switch is turned off.

FIG. 3 is a flowchart illustrating a routine executed by the ECU 10 in this embodiment. The routine illustrated in FIG. 3 is, for example, a periodical interrupt routine activated at predetermined time intervals. The routine is executed for each of the #1–#4 cylinders of the internal combustion engine. When the routine of FIG. 3 is activated, the processing of step 100 is first executed.

In step 100, the ECU 10 determines whether the ignition switch 57 has been operated from the on-state to the off-state. If it is determined that the condition is not established, that is, if it is determined that the ignition switch 57 has remained in the off-state or the on-state, the ECU 10 ends the present cycle of the routine without executing any further processing. Conversely, if it is determined in step 100 that the ignition switch 57 has been operated from the on-state to the off-state, the ECU 10 proceeds to step 102.

When the ignition switch 57 is operated from the on-state to the off-state, the fuel injection by the fuel injection valves 32 and the fuel ignition by the ignition plug 28 are stopped, and the operation of the internal combustion engine is stopped. However, the pistons 18 continue to move due to inertia for a predetermined time after the ignition switch 57 is turned off. In this embodiment, even after the ignition switch 57 is turned off, the electrification of the crank angle sensor 56 is maintained until the electrification of the electromagnetically driven valves 62, 64 is stopped. Therefore, this embodiment allows the crank angle detection even after the ignition switch 57 is turned off.

In step 102, the ECU 10 detects the positions of the intake valves 66 at the time of the turning-off operation of the ignition switch 57 based on the status of supply of exciting current to the first electromagnetic coil 90 and the second electromagnetic coil 94 of each intake valve 66. After step 102, the processing of step 104 is executed.

In step 104, the ECU 10 determines whether the intake valve 66 is in the completely closed state. If it is determined that the intake valves 66 are in the completely closed state, the ECU 10 continues the supply of exciting current to the first electromagnetic coils 90 to maintain the completely closed state of the intake valves 66, and executes the processing of step 106. Conversely, if it is determined in step 104 that the intake valves 66 are not in the completely closed state, the ECU 10 executes the processing of step 108.

In step 108, the ECU 10 determines whether the valve closing timing of the intake valves 66 is reached on the basis of the crank angle. If it is determined that the closing timing of the intake valves 66 is reached, the ECU 10 proceeds to step 110. Conversely, if it is determined in step 108 that the closing timing of the intake valves 66 is not reached, the ECU 10 executes the processing of step 108 again. That is, the processing of step 108 is repeated until the closing timing of the intake valves 66 is reached.

In step 110, the ECU 10 brings each intake valve 66 into the completely closed state by discontinuing the exciting current supplied to the second electromagnetic coil 94, and supplying an appropriate exciting current to the first electromagnetic coil 90 at a time point when the amount of displacement of the armature 88 reaches the predetermined value. Subsequently, the ECU 10 executes the processing of step 106.

In step 106, the ECU 10 discontinues the supply of exciting current to the first electromagnetic coils 90 and the second electromagnetic coils 94 of the exhaust valves 68 while maintaining the completely closed state of the intake valves 66. As a result, each exhaust valve 68 undergoes damping oscillation due to the urging forces from the upper spring 82 and the lower spring 78, and then stops in the half-open state. After step 106, the ECU 10 executes the processing of step 112.

In step 112, the ECU 10 determines whether a pre-set time T1 has elapsed following the turning-off of the ignition switch 57. If it is determined that the time T1 has elapsed following the turning-off of the ignition switch 57, the ECU 10 proceeds to step 114. Conversely, if it is determined in step 112 that the time T1 has not elapsed following the turning-off of the ignition switch 57, the ECU 10 executes the processing of step 112 again. That is, the processing of step 112 is repeated until the elapse of the time T1 following the turning-off of the ignition switch 57.

As mentioned above, the pressure in the intake pipe 36 shown in FIG. 1 is lower than the pressure in the exhaust pipe 50 during operation of the internal combustion engine. When the ignition switch 57 is turned off to stop the internal combustion engine, fresh air gradually flows from outside into the intake passage 36 via the half-open ISCV 44, so that the pressure in the intake passage 36 rises until it equals the pressure in the exhaust passage 50, that is, the atmospheric pressure. The time T1, serving as a criterion for the determination in step 112, is pre-set to, for example, a time that is needed for the pressure in the intake passage 36 to become equal to the pressure in the exhaust passage 50 after the ignition switch 57 is turned off.

In step 114, the ECU 10 discontinues the supply of exciting current to the first electromagnetic coils 90, which has held the intake valves 66 in the completely closed state. Then, the ECU 10 ends the present cycle of the routine. Since the supply of exciting current to the first electromagnetic coils 90 is discontinued, the intake valves 66 of the #1–#4 cylinders undergo damping oscillation and then come to complete stop in the half-open state due to the urging forces from the upper springs 82 and the lower springs 78.

Figure 4:
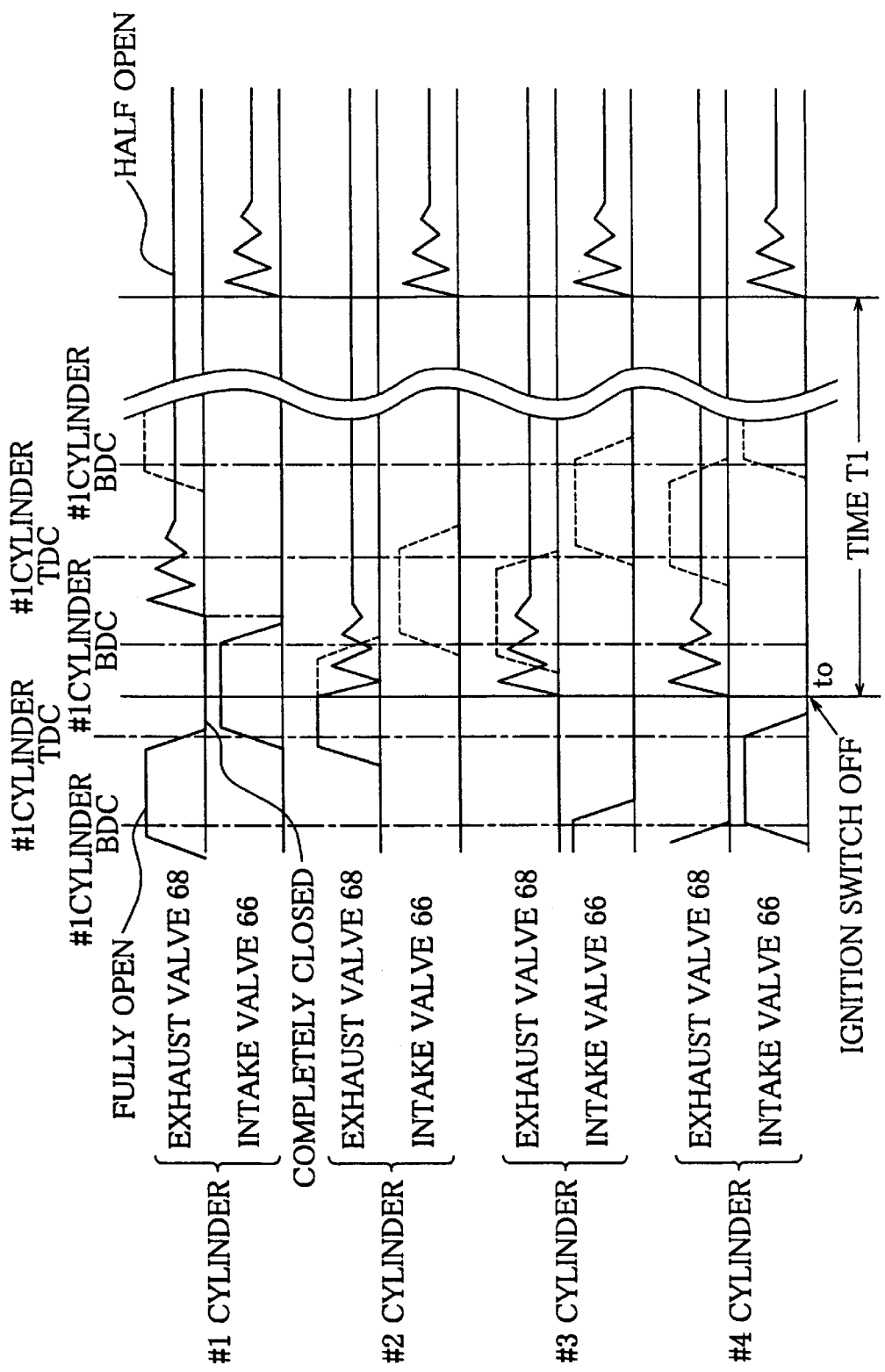
FIG. 4 is a timing chart of an example of displacements of intake valves and exhaust valves, when the routine illustrated in FIG. 3 is executed.

FIG. 4 is a timing chart illustrating an example of displacements of the intake valves 66 and the exhaust valves 68 where the routine illustrated in FIG. 3 is executed. In FIG. 4, the displacements of the exhaust valves 68 and the intake valves 66 that occur if operation of the internal combustion engine is continued are indicated by broken lines.

As indicated in FIG. 4, in the embodiment, if the intake valves 66 of a cylinder are in the completely closed state at a time point t0 at which the ignition switch 57 is turned off as is the case with the #2–#4 cylinders, the supply of exciting current to the first electromagnetic coils 90 and the second electromagnetic coils 94 of the exhaust valves 68 of the same cylinder is discontinued while the completely closed state of the intake valves 66 is maintained. After that, the exhaust valves 68 are brought into the half-open state. Conversely, if the intake valves 66 of a cylinder are not in the completely closed state at the time point t0 as is the case with the #1 cylinder, the intake valves 66 are brought into the completely closed state at the next valve closing timing, and then the supply of exciting current to the first electromagnetic coils 90 and the second electromagnetic coils 94 of the exhaust valves 68 of the same cylinder is discontinued. The completely closed state of the intake valves 66 of the #1–#4 cylinders is maintained until the elapse of the time T1 following the turning-off of the ignition switch 57, that is, until the pressure in the intake passage 36 becomes equal to the pressure in the exhaust passage 50.

Thus, the embodiment holds the intake valves 66 in the completely closed state during the stopping process of the internal combustion engine, thereby preventing low-oxygen-concentration exhaust gas from flowing into the intake manifold 30 or the intake passage 36. Furthermore, until the intake valves 66 not in the completely closed state at the time of turning off the ignition switch 57 are brought into the completely closed state, fresh air containing a sufficient amount of oxygen is fed from the side of the intake passage 36 into the combustion chambers 26, so that discharge of exhaust gas from the internal combustion engine is promoted. Therefore, when the internal combustion engine is to be restarted, the embodiment allows fresh air containing a sufficient amount of oxygen to be supplied from the intake manifold 30 into the combustion chambers 26, thereby preventing the degradation of the starting characteristic of the internal combustion engine.

It is to be noted that if there are intake valves 66 not in the completely closed state at the time of turning off the ignition switch 57, the intake valves 66 may be immediately brought into the completely closed state regardless of the valve timing of the intake valves 66.

A second embodiment of the invention will be described. This embodiment adopts a system construction as shown in FIG. 1. In the embodiment, when the ignition switch 57 is operated from the on-state to the off-state to stop the internal combustion engine, the intake valves 66 and the exhaust valves 68 of the #1–#4 cylinders are driven so that the intake passage 36, the combustion chambers 26 and the exhaust passage 50 are filled with fresh air containing a sufficient amount of oxygen.

Figure 5:
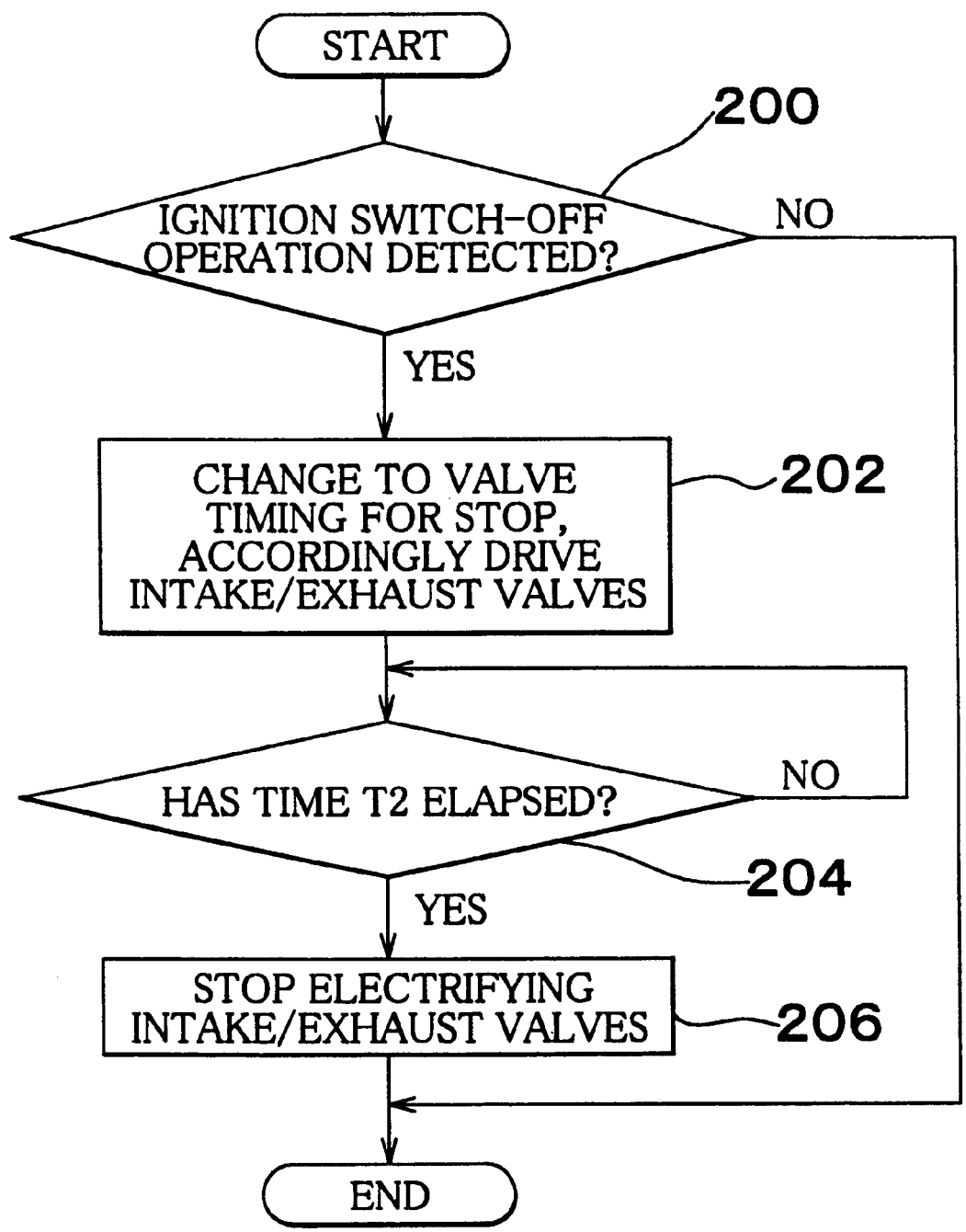
FIG. 5 is a flowchart illustrating a routine executed by the ECU in order to fill the intake passage, combustion chambers, and an exhaust passage with fresh air containing a sufficient amount of oxygen when the ignition switch is turned off.

FIG. 5 is a flowchart illustrating a routine executed by the ECU 10 in this embodiment. The routine illustrated in FIG. 5 is, for example, a periodical interrupt routine activated at predetermined time intervals. When the routine of FIG. 5 is activated, the processing of step 200 is first executed.

In step 200, the ECU 10 determines whether the ignition switch 57 has been operated from the on-state to the off-state. If it is determined that the condition is not established, that is, if it is determined that the ignition switch 57 has remained in the off-state or the on-state, the ECU 10 ends the present cycle of the routine without executing any further processing. Conversely, if it is determined in step 200 that the ignition switch 57 has been operated from the on-state to the off-state, the ECU 10 proceeds to step 202.

The pistons 18 continue to move due to inertia for a predetermined time after the ignition switch 57 is turned off. In this embodiment, even after the ignition switch 57 is turned off, the electrification of the crank angle sensor 56 is maintained until the electrification of the electromagnetically driven valves 62, 64 is stopped, as in the above-described first embodiment. Therefore, this embodiment also allows the crank angle to be detected even after the ignition switch 57 is turned off.

In step 202, the ECU 10 changes the open-close timing of the intake valves 66 and the exhaust valves 68 to the open-close timing set specifically for the stopping process of the internal combustion engine. More specifically, during the process of displacement of the piston 10 of the cylinder 14 shown in FIG. 1 toward the top dead center, the intake valves 66 are set to the completely closed state by supplying exciting current to the first electromagnetic coils 90 of the intake valves 66, and the exhaust valves 68 are set to the fully open state by supplying exciting current to the second electromagnetic coils 94 of the exhaust valves 68. As a result, exhaust gas is discharged from the combustion chamber 26 into the atmosphere via the exhaust passage 50. During the process of displacement of the piston 10 shown in FIG. 1 toward the bottom dead center, the intake valves 66 are set to the fully open state by supplying exciting current to the second electromagnetic coils 94 of the intake valves 66, and the exhaust valves 68 are set to the completely closed state by supplying exciting current to the first electromagnetic coils 90 of the exhaust valves 68. As a result, fresh air is fed from the side of the intake manifold 30 into the combustion chamber 26. Therefore, due to the processing of step 202, the internal combustion engine is caused to perform a pumping operation in a two-stroke manner, so that exhaust gas is effectively discharged out of the internal combustion engine, and so that fresh air containing a sufficient amount of oxygen is charged into the intake passage 36, the combustion chambers 26, and the exhaust passage 50. After step 202, the ECU 10 executes the processing of step 204.

In step 204, the ECU 10 determines whether a pre-set time T2 has elapsed following the turning-off of the ignition switch 57. If it is determined that the time T2 has elapsed following the turning-off of the ignition switch 57, the ECU 10 proceeds to step 206. Conversely, if it is determined in step 204 that the time T2 has not elapsed following the turning-off of the ignition switch 57, the ECU 10 executes the processing of step 204 again. That is, the processing of step 204 is repeated until the elapse of the time T2 following the turning-off of the ignition switch 57. The time T2, serving as a criterion for the determination in step 204, is pre-set to a time that is needed for fresh air to fill the intake passage 36, the combustion chambers 26, and the exhaust passage 50.

In step 206, the ECU 10 discontinues the supply of exciting current to the first electromagnetic coils 90 and the second electromagnetic coils 94 corresponding to the intake valves 66 and the exhaust valves 68 of each of the #1–#4 cylinders. The ECU 10 then ends the present cycle of the routine. Since the supply of exciting current to the first electromagnetic coils 90 and the second electromagnetic coils 94 is discontinued, the intake valves 66 and the exhaust valves 68 of the #1–#4 cylinders undergo damping oscillation and then come to stop in the half-open state due to the urging forces from the upper springs 82 and the lower springs 78.

Figure 6:
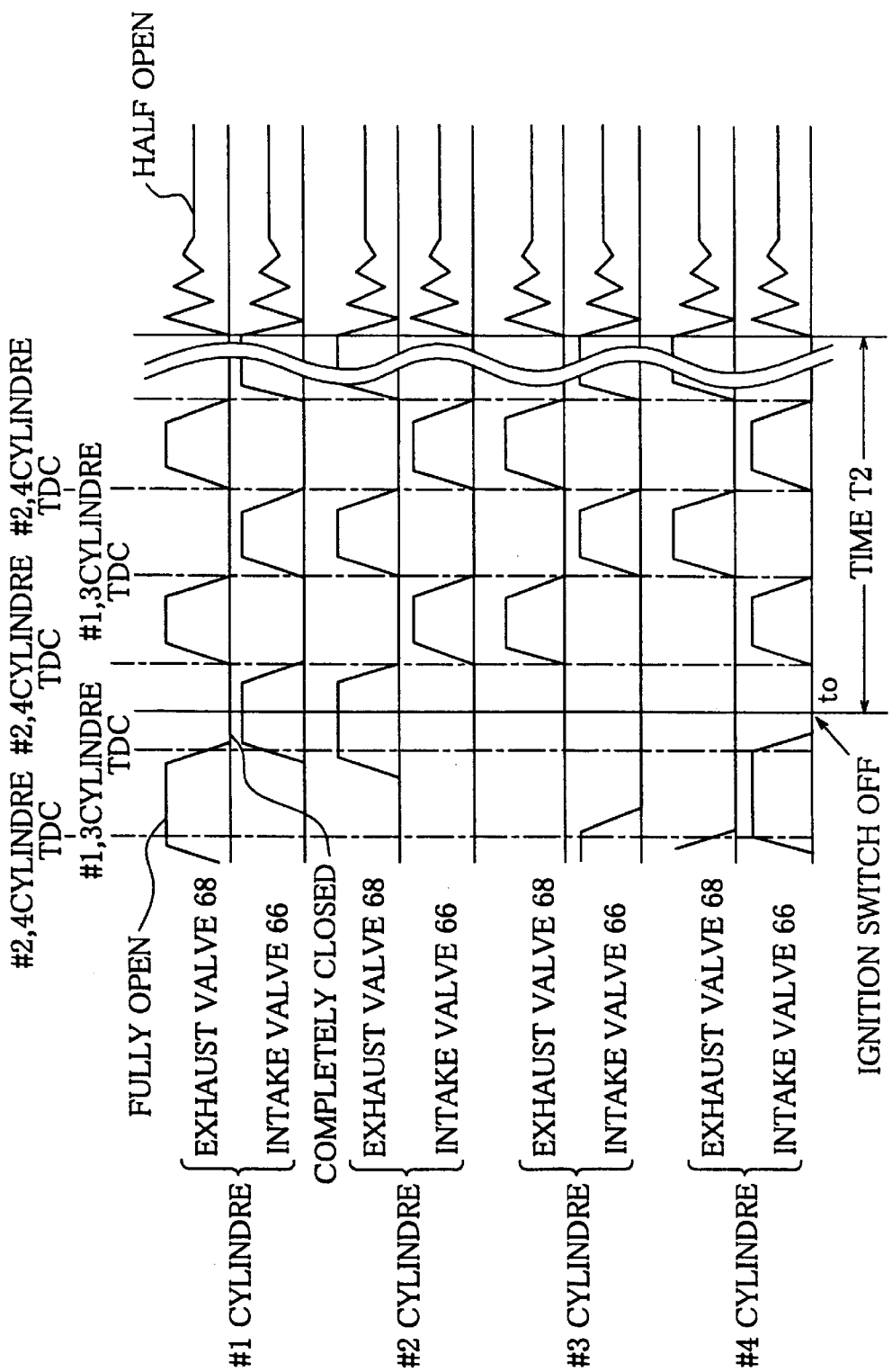
FIG. 6 is a timing chart of an example of displacements of the intake valves and the exhaust valves, when the routine illustrated in FIG. 5 is executed.

FIG. 6 is a timing chart illustrating an example of displacements of the intake valves 66 and the exhaust valves 68 where the routine illustrated in FIG. 5 is executed. In FIG. 6, the displacements of the exhaust valves 68 and the intake valves 66 that occur if operation of the internal combustion engine is continued are indicated by broken lines.

As indicated in FIG. 6, in this embodiment, the open-close timing of the intake valves 66 and the exhaust valves 68 of the #1–#4 cylinders is set to the timing for the stopping process of the internal combustion engine, for the predetermined time T2 following a time point t0 at which the ignition switch 57 is turned off. That is, during the process of displacement of, for example, the piston 18 shown in FIG. 1, toward the top dead center, the intake valves 66 corresponding to the piston 18 are set to the completely closed state, and the corresponding exhaust valves 68 are set to the fully open state. During the process of displacement of the piston 18 toward the bottom dead center, the intake valves 66 are set to the fully open state, and the exhaust valves 68 are set to the completely closed state. As a result, exhaust gas is effectively discharged from the combustion chambers 26 and the exhaust passage 50, and fresh air containing a sufficient amount of oxygen fills the intake passage 36, the combustion chambers 26, and the exhaust passage 50.

According to the embodiment, therefore, when the internal combustion engine is to be restarted, fresh air containing a sufficient amount of oxygen is supplied from the intake manifold 30 into the combustion chambers 26, thereby preventing the degradation of the starting characteristic of the internal combustion engine.

Instead of the above-described processing of step 202, it is also possible to open and close the intake valves 66 and the exhaust valves 68 at the timing that is unchanged from the open-close timing adopted during normal operation of the internal combustion engine. This modified processing may decrease the exhaust gas discharging efficiency, but eliminates the need to change the control software and therefore allows simplification of the construction.

A third embodiment of the invention will be described. This embodiment adopts a system construction as shown in FIG. 1. In this embodiment, when the ignition switch 57 is operated from the on-state to the off-state to stop the internal combustion engine, the ISCV 44 shown in FIG. 1 is controlled to the open side.

Figure 7:
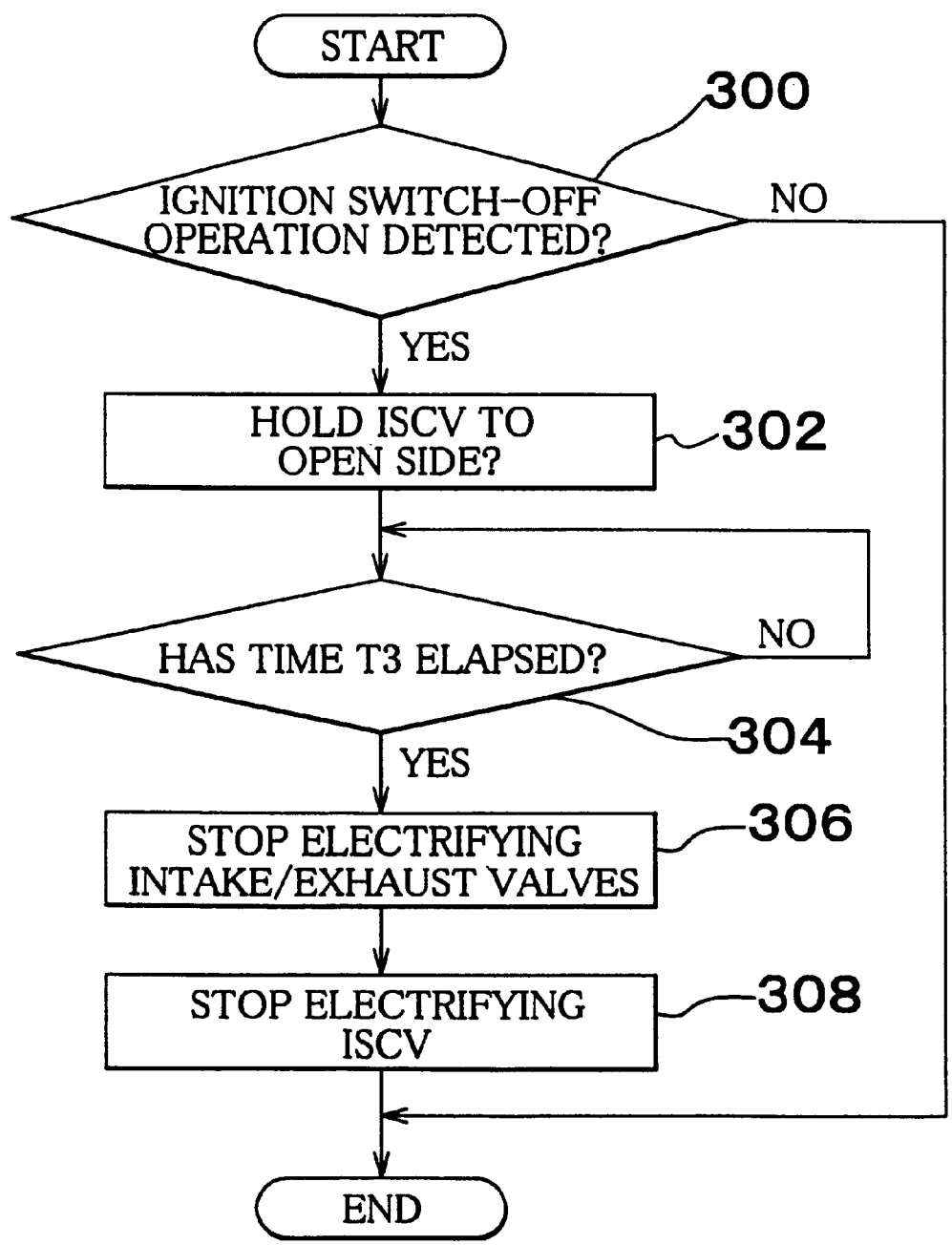
FIG. 7 a flowchart illustrating a routine executed by the ECU in order to quickly raise the pressure in the intake passage to the atmospheric pressure, that is, a pressure equal to that in the exhaust passage, when the ignition switch is turned off.

FIG. 7 is a flowchart illustrating a routine executed by the ECU 10 in this embodiment. The routine illustrated in FIG. 7 is, for example, a periodical interrupt routine activated at predetermined time intervals. When the routine of FIG. 7 is activated, the processing of step 300 is first executed.

In step 300, the ECU 10 determines whether the ignition switch 57 has been operated from the on-state to the off-state. If it is determined that the condition is not established, that is, if it is determined that the ignition switch 57 has remained in the off-state or the on-state, the ECU 10 ends the present cycle of the routine without executing any further processing. Conversely, if it is determined in step 300 that the ignition switch 57 has been operated from the on-state to the off-state, the ECU 10 proceeds to step 302.

The pistons 18 continue to move due to inertia for a predetermined time after the ignition switch 57 is turned off. In this embodiment, even after the ignition switch 57 is turned off, the electrification of the crank angle sensor 56 and the ISCV 44 is maintained until the electrification of the electromagnetically driven valves 62, 64 is stopped. Therefore, this embodiment allows the crank angle detection and the driving of the ISCV 44 continues even after the ignition switch 57 is turned off.

In step 302, driving current is supplied to the ISCV 44 to hold the ISCV 44 to the open side. As a result, the flow of fresh air into the intake passage 36 from outside via the ISCV 44 increases, so that the pressure in the intake passage 36 quickly rises to the atmospheric pressure. After step 302, the ECU 10 executes the processing of step 304.

In step 304, the ECU 10 determines whether a pre-set time T3 has elapsed following the turning-off of the ignition switch 57. If it is determined that the time T3 has elapsed following the turning-off of the ignition switch 57, the ECU 10 proceeds to step 306. Conversely, if it is determined in step 304 that the time T3 has not elapsed following the turning-off of the ignition switch 57, the ECU 10 executes the processing of step 304 again. That is, the processing of step 304 is repeated until the elapse of the time T3 following the turning-off of the ignition switch 57. The time T3, serving as a criterion for the determination in step 304, is pre-set to a time that is needed for the pressure in the intake passage 36 to rise to the atmospheric pressure, that is, a pressure equal to that in the exhaust passage 50, due to inflow of fresh air via the ISCV 44 held to the open side.

In step 306, the ECU 10 discontinues the supply of exciting current to the first electromagnetic coils 90 and the second electromagnetic coils 94 corresponding to the intake valves 66 and the exhaust valves 68 of each of the #1–#4 cylinders. As a result, the intake valves 66 and the exhaust valves 68 of the #1–#4 cylinders undergo damping oscillation and then come to stop in the half-open state due to the urging forces from the upper springs 82 and the lower springs 78. After step 306, the ECU 10 executes the processing of step 308. Until the supply of exciting current to the first electromagnetic coils 90 and the second electromagnetic coils 94 is discontinued, the intake valves 66 and the exhaust valves 68 are opened and closed at the timing unchanged from that used during normal operation of the internal combustion engine, so that discharge of exhaust gas from the internal combustion engine is promoted.

In step 308, the ECU 10 discontinues the electrification of the ISCV 44. As a result, the ISCV 44 moves toward the closed side to become half open. After step 308, the ECU 10 ends the present cycle of the routine.

Thus, in this embodiment, during the predetermined time T3 following the turning-off of the ignition switch 57, the ISCV 44 is held to the open valve side, so that the inflow of fresh air via the ISCV 44 increases. As a result, the difference between the pressure in the intake passage 36 and the pressure in the exhaust passage 50 is quickly reduced, so that exhaust gas having a low oxygen concentration is prevented from flowing into the intake manifold 30 and the intake passage 36. Furthermore, until the supply of exciting current to the first electromagnetic coils 90 and the second electromagnetic coils 94 is discontinued in step 306, the intake valves 66 and the exhaust valves 68 are opened and closed at the timing unchanged from that used during normal operation of the internal combustion engine, so that discharge of exhaust gas from the internal combustion engine is promoted.

According to this embodiment, therefore, when the internal combustion engine is to be restarted, fresh air containing a sufficient amount of oxygen is supplied from the intake manifold 30 into the combustion chambers 26, thereby preventing the degradation of the starting characteristic of the internal combustion engine.

It should be appreciated that the processing of step 302 in the third embodiment, the throttle valve 38, instead of the ISCV 44, may be controlled to the open side.

Furthermore, in the processing of step 112, 204, 304 in the first to third embodiments, it is also possible to set the intake valves 66 and the exhaust valves 68 to the half-open state when the pressure in the intake passage 36 detected based on the output signal from the intake pressure sensor 46 becomes equal to the atmospheric pressure, instead of the determination based on the predetermined time T1, T2, T3. It is also possible to set the intake valves 66 and the exhaust valves 68 to the half-open state when it is determined that the exhaust pipe 50 is filled with fresh air on the basis of the oxygen concentration in the exhaust pipe 50 detected based on the output signal of an $O_2$ sensor 400 (FIG. 1) provided in the exhaust pipe 50.

As shown in FIG. 1, the ECU 10 may be implemented on a programmed general purpose computer. However, the ECU 10 can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device capable of implementing a finite state machine that is in turn capable of implementing the flowcharts shown in FIGS. 3, 5, and 7, can be used to implement ECU 10.

While the invention has been described with reference to preferred embodiments thereof, it is to be understood that the invention is not limited to the disclosed embodiments or constructions. On the contrary, the invention is intended to cover various modifications and equivalent arrangements.

What is claimed is:

1. A control apparatus, comprising:
   electromagnetically driven actuators that respectively drive an intake valve and an exhaust valve of an internal combustion engine, at least the intake valve assuming an open state when its actuator is not electrified; and
   a controller coupled to the electromagnetically driven actuators and that:
   determines whether an ignition switch is turned off; and
   prevents an exhaust gas from flowing into an intake passage that communicates with the intake valve by driving the electromagnetically driven actuators when the ignition switch is determined to have been turned off.

2. A control apparatus according to claim 1, wherein the controller holds the intake valve in a closed state during a predetermined length of time after the ignition switch is determined to have been turned off.

3. A control apparatus according to claim 2, wherein the predetermined length of time is a time that is needed for a pressure in the intake passage to become substantially equal to a pressure in an exhaust passage after the ignition switch is determined to have been turned off.

4. A control apparatus according to claim 2, wherein the controller drives the intake valve to the closed state when the ignition switch is determined to have been turned off.

5. A control apparatus according to claim 1, wherein until a predetermined length of time elapses after the ignition switch is determined to have been turned off, the controller drives each of the valves at an opening-closing timing that is unchanged from an opening-closing timing that is used while the ignition switch is turned on during a normal operation of the internal combustion engine.

6. A control apparatus according to claim 5, wherein the predetermined length of time is a time that is needed for fresh air to fill the intake passage, a combustion chamber, and an exhaust passage.

7. A control apparatus according to claim 1, wherein until a predetermined length of time elapses after the ignition switch is determined to have been turned of f, the controller, during a process of displacement of a piston toward a top dead center, sets the intake valve to a closed state and sets the exhaust valve to the open state and, during a process of displacement of the piston toward a bottom dead center, sets the intake valve to the open state and sets the exhaust valve to the closed state.

8. A control apparatus according to claim 7, wherein the predetermined length of time is a time that is needed for fresh air to fill the intake passage, a combustion chamber, and an exhaust passage.

9. A control apparatus according to claim 1, wherein the controller reduces a negative pressure in the intake passage by controlling at least one of an idle speed control valve of the internal combustion engine and a throttle valve of the internal combustion engine to an open side during a predetermined length of time after the ignition switch is determined to have been turned off.

10. A control apparatus according to claim 9, wherein the predetermined length of time is a time that is needed for a pressure in the intake passage to rise to a pressure that is substantially equal to a pressure in an exhaust passage.

11. A control apparatus according to claim 1, further comprising an intake pressure sensor that detects a pressure in the intake passage,
   wherein the controller stops electrification of the actuators of the intake valve and of the exhaust valve when the pressure detected in the intake passage becomes substantially equal to an atmospheric pressure.

12. A control apparatus according to claim 1, further comprising an oxygen sensor that detects an oxygen concentration in an exhaust passage,
   wherein the controller stops electrification of the intake valve and of the exhaust valve when the controller determines that the exhaust passage is filled with fresh air based on the oxygen concentration detected in the exhaust passage.

13. A control apparatus, comprising:
   electromagnetically driven actuators that respectively drive an intake valve and an exhaust valve of an internal combustion engine, at least the intake valve assuming an open state when its actuator is not electrified; and
   a controller coupled to the electromagnetically driven actuators and that:
   determines whether an ignition switch is turned off; and
   reduces a negative pressure in an intake passage that communicates with the intake value when the ignition switch is determined to have been turned off.

14. A control apparatus according to claim 13, wherein the controller controls at least one of an idle speed control valve of the internal combustion engine and a throttle valve of the internal combustion engine to an open side when the ignition switch is determined to have been turned off.

15. A control apparatus according to claim 14, wherein the controller controls the at least one of the idle speed control valve and the throttle valve to the open side during a predetermined length of time after the ignition switch is determined to have been turned off.

16. A control apparatus according to claim 15, wherein the predetermined length of time is a time that is needed to change the negative pressure in the intake passage to a pressure that is substantially equal to a pressure in an exhaust passage.

17. A control apparatus according to claim 13, further comprising an intake pressure sensor that detects a pressure in the intake passage,
   wherein the controller stops electrification of the actuators of the intake valve and of the exhaust valve when the pressure detected in the intake passage becomes substantially equal to an atmospheric pressure.

18. A control apparatus according to claim 13, further comprising an oxygen sensor that detects an oxygen concentration in an exhaust passage,
   wherein the controller stops electrification of the actuators of the intake valve and of the exhaust valve when it is determined that the exhaust passage is filled with fresh air based on the oxygen concentration detected in the exhaust passage.

19. A control method, comprising:
   driving respective actuators of an intake valve and an exhaust valve of an internal combustion engine, at least the intake valve assuming an open state when its actuator is not actuated;
   determining whether an ignition switch is turned off; and preventing an exhaust gas from flowing into an intake passage that communicates with the intake valve by driving the actuators when the ignition switch is determined to have been turned off.

20. A control method according to claim 19, further comprising holding the intake valve in a closed state during a predetermined length of time after the ignition switch is determined to have been turned off.

21. A control method according to claim 20, wherein the predetermined length of time is a time that is needed for a pressure in the intake passage to become substantially equal to a pressure in an exhaust passage after the ignition switch is determined to have been turned off.

22. A control method according to claim 20, further comprising driving the intake valve to the closed state when the ignition switch is determined to have been turned off.

23. A control method according to claim 19, wherein until a predetermined length of time elapses after the ignition switch is determined to have been turned off, driving the respective actuators of each valve at an opening-closing timing that is unchanged from an opening-closing timing that is used while the ignition switch is turned on during a normal operation of the internal combustion engine.

24. A control method according to claim 23, wherein the predetermined length of time is a time that is needed for fresh air to fill the intake passage, a combustion chamber, and an exhaust passage.

25. A control method according to claim 19, wherein until a predetermined length of time elapses after the ignition switch is determined to have been turned off, during a process of displacement of a piston toward a top dead center, setting the intake valve to a closed state and setting the exhaust valve to the open state and, during a process of displacement of the piston toward a bottom dead center, setting the intake valve to the open state and setting the exhaust valve to the closed state.

26. A control method according to claim 25, wherein the predetermined length of time is a time that is needed for a fresh air to fill the intake passage, a combustion chamber, and an exhaust passage.

27. A control method according to claim 19, further comprising reducing negative pressure in the intake passage by controlling at least one of an idle speed control valve of the internal combustion engine and a throttle valve of the internal combustion engine to an open side during a predetermined length of time after the ignition switch is determined to have been turned off.

28. A control method according to claim 27, wherein the predetermined length of time is a time that is needed for a pressure in the intake passage to rise to a pressure that is substantially equal to a pressure in an exhaust passage.

29. A control method according to claim 19, further comprising detecting a pressure in the intake passage; and stopping the driving of the actuators of the intake valve and the exhaust valve when the pressure detected in the intake passage becomes substantially equal to an atmospheric pressure.

30. A control method according to claim 19, further comprising detecting an oxygen concentration in an exhaust passage; and stopping the driving to the actuators of the intake valve and exhaust valve when it is determined that the exhaust passage is filled with fresh air based on the oxygen concentration detected in the exhaust passage.

31. A control method, comprising:

driving respective actuators of an intake valve and an exhaust valve of an internal combustion engine, at least the intake valve assuming an open state when its actuator is not actuated;

determining whether an ignition switch is turned off; and reducing a negative pressure in an intake passage when the ignition switch is determined to have been turned off.

32. A control method according to claim 31, further comprising controlling at least one of an idle speed control valve of the internal combustion engine and a throttle valve of the internal combustion engine to an open side when the ignition switch is determined to have been turned off.

33. A control method according to claim 32, wherein the at least one of the idle speed control valve and the throttle valve is controlled to the open side during a predetermined length of time after the ignition switch is determined to have been turned off.

34. A control method according to claim 33, wherein the predetermined length of time is a time that is needed to change the negative pressure in the intake passage to a pressure that is substantially equal to a pressure in an exhaust passage.

35. A control method according to claim 31, further comprising detecting a pressure in the intake pipe; and stopping the driving of the actuators of the intake valve and the exhaust valve when the pressure detected in the intake passage becomes substantially equal to an atmospheric pressure.

36. A control according to claim 31, further comprising detecting an oxygen concentration in an exhaust passage; and stopping the driving to the actuators of the intake valve and exhaust valve when it is determined that the exhaust passage is filled with fresh air based on the oxygen concentration detached in the exhaust passage.

* * * * *